United States Patent
Roberts

(10) Patent No.: US 11,275,558 B2
(45) Date of Patent: Mar. 15, 2022

(54) SORTING INSTANCES OF INPUT DATA FOR PROCESSING THROUGH A NEURAL NETWORK

(71) Applicant: Advanced Micro Devices, Inc., Santa Clara, CA (US)

(72) Inventor: David A. Roberts, Wellesley, MA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 742 days.

(21) Appl. No.: 16/206,879

(22) Filed: Nov. 30, 2018

(65) Prior Publication Data

US 2020/0174748 A1 Jun. 4, 2020

(51) Int. Cl.
*G06F 7/22* (2006.01)
*G06F 16/901* (2019.01)
*G06N 3/04* (2006.01)

(52) U.S. Cl.
CPC .............. *G06F 7/22* (2013.01); *G06F 16/901* (2019.01); *G06N 3/04* (2013.01)

(58) Field of Classification Search
CPC ........................................................ G06F 7/22
See application file for complete search history.

(56) References Cited

U.S. PATENT DOCUMENTS

2017/0132288 A1* 5/2017 Ho .................... G06F 40/30
2018/0341642 A1* 11/2018 Akerib ................ G06N 3/0427

OTHER PUBLICATIONS

M. Riera et al., "Computation Reuse in DNNs by Exploiting Input Similarity," 2018 ACM/IEEE 45th Annual International Symposium on Computer Architecture (ISCA), Jun. 2018, pp. 57-68.

* cited by examiner

Primary Examiner — Roland J Casillas
(74) Attorney, Agent, or Firm — Park, Vaughan, Fleming & Dowler LLP

(57) ABSTRACT

An electronic device including a neural network processor and a presorter is described. The presorter determines a sorted order to be used by the neural network processor for processing a set of instances of input data through the neural network, the determining including rearranging an initial order of some or all of the instances of input data so that instances of input data having specified similarities among the some or all of the instances of input data are located nearer to one another in the sorted order. The presorter provides, to the neural network processor, the sorted order to be used for controlling an order in which instances of input data from among the set of instances of input data are processed through the neural network. A controller in the electronic device adjusts operation of the presorter based on efficiencies of the presorter and the neural network processor.

20 Claims, 5 Drawing Sheets

SORTING INSTANCES OF INPUT DATA FOR PROCESSING THROUGH A NEURAL NETWORK

BACKGROUND

Related Art

Some electronic devices perform operations for artificial neural networks or, more simply, "neural networks." Generally, a neural network is a computational structure that includes internal elements having similarities to biological neural networks, such as those in a living creature's brain. Neural networks can be trained to perform various types of operations. The training is performed by using known data to configure the internal elements of the neural network so that the neural network can then perform a specified task on unknown data. For example, a neural network may be trained by using images that are known to include (or not) particular image elements (e.g., faces, vehicles, etc.) to configure the internal elements of the neural network to react appropriately when subsequently analyzing images to determine whether the images include the image elements.

Neural networks include, in their internal elements, a set of artificial neurons, or "nodes," that are interconnected to one another in an arrangement similar to how neurons are interconnected via synapses in a living creature's brain. A neural network can be visualized as a form of weighted graph structure in which the nodes include input nodes, intermediate nodes, and output nodes. Within the neural network, each node other than the output nodes is connected to one or more downstream nodes via a directed edge that has an associated weight. During operation, input nodes in a first layer of the neural network receive inputs from an external source and process the inputs to produce input values. The input nodes forward the input values to intermediate nodes in the next layer of the neural network. The receiving intermediate nodes weight the received inputs based on a weight of a corresponding directed edge, i.e., adjust the received inputs such as multiplying by a weighting value, etc. Each intermediate node sums the corresponding weighted received inputs and possibly a bias value to generate an internal value and evaluates an activation function for the intermediate node using the internal value to produce a result value. The intermediate nodes then forward the result values as input values to intermediate nodes in the next layer of the neural network, where the input values are used to generate internal values and evaluate an activation function as described above. In this way, values progress through intermediate nodes in layers of the neural network until a last layer of intermediate nodes forward result values to output nodes for the neural network, which generate outputs for the neural network. Continuing the example above, the outputs produced by the output nodes—and thus from the neural network—can be in a form, e.g., a number between 0-1, that indicates whether or not an image is likely to include (or not) a specified image element.

When processing inputs, or "instances of input data," in a neural network, the computation of internal values for nodes, i.e., computing the sums of weighted input values for nodes and using the internal values to evaluate the activation functions, accounts for the majority of the overall processing effort and energy consumption associated with processing the instances of input data. Designers have therefore proposed a number of techniques for improving the efficiency of these computations. One such technique is described in Riera, M. et al. in the paper "Computation Reuse in DNNs by Exploiting Input Similarity," 2018 ACM/IEEE 45th Annual International Symposium on Computer Architecture. In the paper, Riera observes that some neural networks operate on instances of input data that are similar, such as neural networks that classify image frames from an on-board camera in a vehicle or a security camera. Riera also observes that, when two or more instances of input data are similar, the response of nodes in the neural network and the output of the neural network are similar. Based on these two observations, Riera proposes reusing results from nodes in a neural network that are generated when processing instances of input data through the neural network to simplify and speed up the processing of subsequent instances of input data.

In the Riera system, when processing a given instance of input data (e.g., a first instance) through the neural network, a neural network processor processes the given instance of input data normally to generate result values for nodes—i.e., computes internal values for nodes as the sum of corresponding input values and evaluates the activation function based on the internal values. The neural network processor saves the results from the nodes in the neural network, such as by storing the results for each of the nodes in a local cache or memory in the neural network processor. When processing a next instance of input data through the neural network, instead of computing internal values and evaluating the activation functions to generate results from nodes, the neural network processor uses the stored result values for computing current result values for nodes. More specifically, Riera computes the current result value for each node by adjusting a stored result value for that node based on a difference, if any, between stored input values for that node and the current input values for that node. (Recall that result values from nodes in a prior layer serve as each node's inputs, so the stored result values from nodes in a prior layer are also the stored input values for that node.) In the event that all inputs match, the Riera system simply reuses the stored results for nodes with no adjustment. Even when a few of the inputs do not match, the neural network processor can perform a smaller number of simple computations and memory accesses for generating the result from the node. By reusing results from nodes, therefore, Riera reduces the number and complexity of computations and memory accesses for computing the results for nodes, which can help to conserve electrical energy and speed up the processing of instances of input data through the neural network.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that the term may have significant additional aspects that are not recited herein for clarity and brevity and thus the description is not intended to limit the term.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory).

Neural Network

Figure 1:
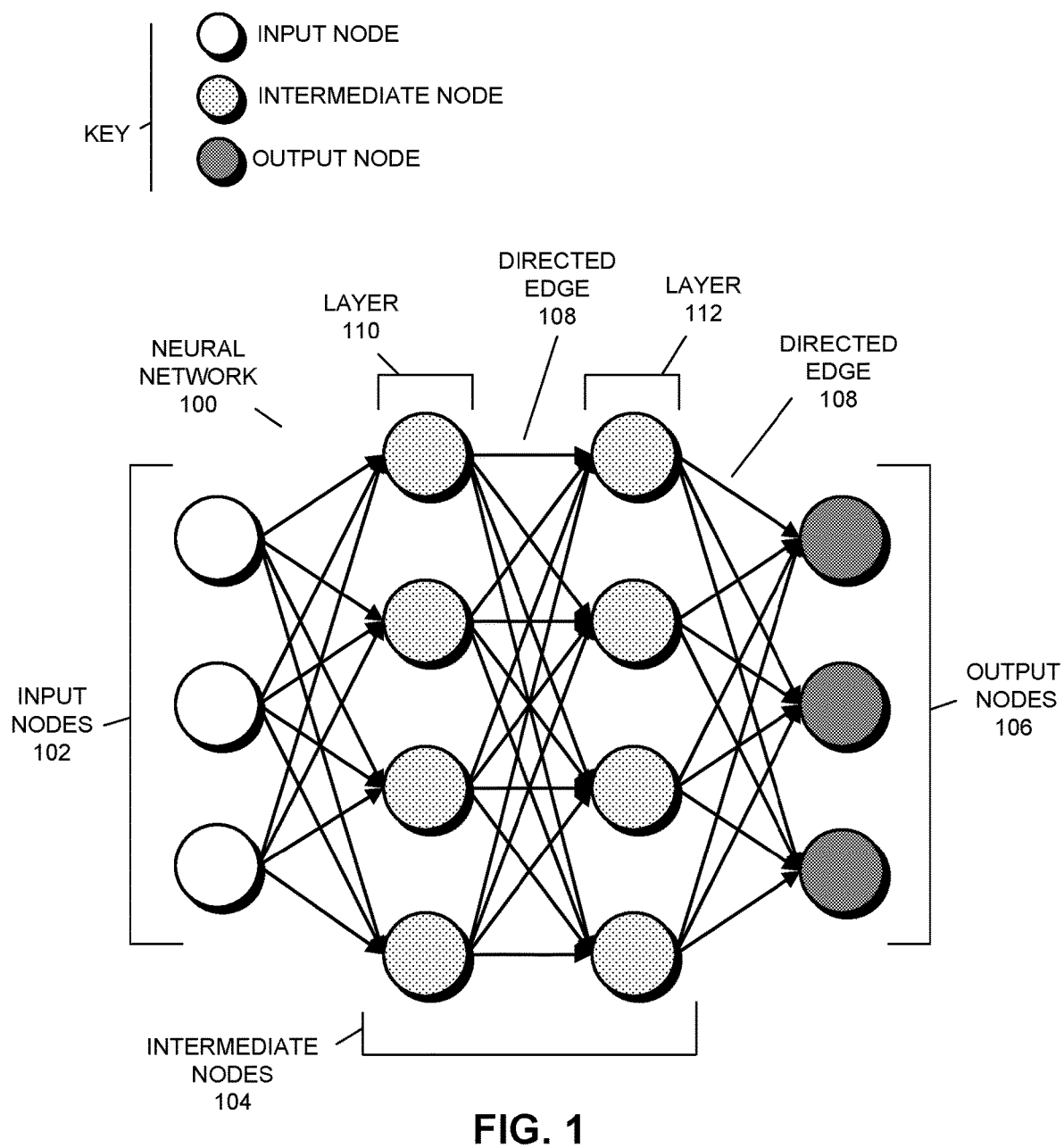
FIG. 1 presents a block diagram illustrating a neural network in accordance with some embodiments.

As described above, a neural network is a computational structure that includes internal elements (i.e., nodes and directed edges) that are trained to perform specified tasks, such as image or audio recognition or "classification," image or audio generation, etc. FIG. 1 presents a block diagram illustrating a neural network 100 including input nodes 102, intermediate nodes 104 in layers 110 and 112, output nodes 106, and directed edges 108 in accordance with some embodiments (only two directed edges and layers are labeled for clarity).

Depending on the nature of the internal elements of neural network 100, neural network 100 can be a "discriminative" network or a "generative" network. A discriminative network is a neural network that is configured to process instances of input data and output results that indicate whether specified patterns are likely to be present in the instances of input data—i.e., to classify instances of input data. For example, a discriminative network may be configured to output results indicating whether image elements such as faces or road signs are likely present in digital images, whether particular sounds or words are likely present in digital audio, etc. A generative network is a neural network that is configured to generate instances of output data that include patterns having similarity to specified patterns. For example, the generative network may be configured to generate digital images that include patterns similar to faces or road signs, audio that includes patterns similar to particular sounds or words, etc.

Although an example of a neural network is presented in FIG. 1, in some embodiments, a different arrangement of nodes and/or layers is present in the neural network. For example, a neural network can include a large number—and in some cases, millions or billions—of intermediate nodes arranged in numerous layers, each layer of intermediate nodes receiving input values and forwarding generated result values to intermediate nodes in the next layer or to output nodes. As another example, in some embodiments, a different topography or connectivity of nodes is used and/or different types of nodes are used, such as the arrangements and types of nodes used in neural networks including radial basis networks, recurrent neural networks, auto encoders, Markov chains, deep belief networks, deep convolutional networks, deep residual networks, etc. Generally, the described embodiments are operable with any configuration of neural network for which processing operations can be performed as described herein.

Reusing Result Values for Processing Instances of Input Data Through a Neural Network As described above, processing similar instances of input data through a neural network can result in similar results from nodes and outputs from the neural network. For example, when processing neighboring frames of video such as those captured by a security camera or a vehicle's forward-facing camera, there may be only small differences in the images, and thus the results of nodes and output of the neural network for the neighboring frames can be similar. The described embodiments take advantage of the responses of neural networks to similar instances of input data in order to simplify the computation of node results when processing instances of input data. In the described embodiments, when processing instances of input data in a neural network, a neural network processor uses stored previous result values from nodes in the neural network for computing current result values. Because the computations when using the stored previous result values are typically simpler, faster, and require less memory accesses than the computations and memory accesses associated with the normal computation of result values, the described embodiments can process instances of input data through the neural network while consuming less electrical power and with reduced latency.

When processing instances of input data through a neural network, the described embodiments use a technique similar to that described by M. Riera et al. in the paper "Computation Reuse in DNNs by Exploiting Input Similarity," 2018 ACM/IEEE 45th Annual International Symposium on Computer Architecture, which is incorporated by reference herein. Generally, in the described embodiments, results of nodes in a neural network—which function as input values to downstream nodes—are stored/saved and used when processing one or more subsequent instances of input data in order to avoid certain computations and memory accesses. The use of the stored result values is based on the observation that the current result of a node in a neural network, $r^2$, can be computed by updating/adjusting a previous result of the node, $r^1$, using associated input values—which, again, are result values from nodes in a previous layer in the neural network. For example, consider a node of a fully-connected layer with three inputs, such as the topmost intermediate node in layer 110 in FIG. 1. When processing a first instance of input data through the neural network, the result $r^1$ of such a node is computed $r^1 = i_1^1 w_1 + i_2^1 w_2 + i_3^1 w_3 + b$, where i, w, and b are the inputs and weights associated with each input, and bias of the node, respectively. When processing a second instance of input data through the neural network, the result $r^2$ of the node is normally computed in the same way, i.e., $r^2 = i_1^2 w_1 + i_2^2 w_2 + i_3^2 w_3 + b$. The computation of the current result $r^2$ for the node can, however, be computed based on the previous result $r^1$ for the node using a different computation. The general form of the computation of the result $r^2$ for the node based on the previous result $r^1$ for the node is as follows:

$$r^2 = r^1 + \sum_{i=1}^{N} ((c_i' - c_i) * w_i)$$

Where $r^2$ is the current result for a node, $r^1$ is the previous result for the node, and the summation is of the difference between a present value of each input $c_i'$ to the node and a previous value of that input $c_i$ multiplied by a weight w associated with that input. In other words, a result for the node when processing the current instance of input data can be computed by subtracting the previous inputs from the respective current inputs, multiplying the difference by the associated weights, and adding these values to the previous result. This general form of the computation can be reduced where input values match because the corresponding subtraction of inputs equals zero. For example, assuming that the first two inputs of the three-input example above match, the current result $r^2$ can be computed using the prior result $r^1$ as $r^2 = r^1 + (i_3^2 - i_3^1) w_3$, thereby avoiding computations associated with the first two inputs. When some or all of the input values match, therefore, the results of nodes may be more computed using simpler operations than computing the results in the normal way.

By computing the result for the node for processing the second instance of input data using stored results as described, operations such as fetching weight values from memory and mathematical computations can be reduced or avoided. More specifically, continuing the example above, one weight has to be acquired from memory instead of three, the bias is not needed, and three computations are performed instead of six (only one of which is a multiplication operation). In addition, the value computed by subtracting the two inputs can be reused for all nodes that receive the input, which spreads out the cost of performing the comparison and subtraction among the nodes that receive inputs (in terms of delay and electrical power consumption).

In some embodiments, when processing a given instance of input data (e.g., a first instance of input data) through a neural network, the results generated by nodes in each layer are saved. For example, the results can be stored in a cache or memory associated with a neural network processor, etc. As one or more subsequent instances of input data are processed in the neural network processor, the inputs to layers of nodes (or, rather, results from nodes in previous layers, which function as inputs to the layers of nodes) are compared to the stored inputs (stored results from nodes in previous layers), and the current results of nodes are computed by adjusting the previous results of nodes, if necessary, using the inputs that have changed as described above. By performing these operations, these embodiments avoid computing results for nodes in the neural network in the normal way, i.e., avoid the computation of weighted input values, the computation of the sum of the weighted input values to generate internal values, and the evaluation of the activation function using the internal value to determine a result of the node.

In some embodiments, because it is uncommon for inputs, which can be, e.g., 32-bit floating point values, to be precisely the same even for similar instances of input data, the inputs are "quantized" by being set to a value from among a range of values. For example, each input, which may be bound to be between 0-1 within the neural network, may be quantized by being set to a nearest one of 32 values between 0-1, such as 0, 0.03125, 0.0625, etc. Quantizing improves the number of matches between inputs, which enables simpler computations when reusing the result values. Quantizing the inputs at least nominally reduces the accuracy of the results from the nodes and thus the output generated by the neural network. When a fine enough resolution of quantization is selected, however, the outputs generated by the neural network over a larger number of instances of input data generally appear as would the outputs generated without quantization. For example, some embodiments use quantization ranges that include 32 values or 64 values to avoid larger changes in neural network outputs.

The technique described above, in which result values are stored and reused, applies fully-connected layers of nodes in a neural network and other neural networks in which results are computed for nodes in a similar way. In some embodiments, other arrangements of neural network, such as a recurrent neural networks or recurrent layers within neural networks, convolutional neural networks or convolutional layers within neural networks, etc., operate using similar general principles, but adjusted for the particular computations performed to generate internal values and results for such arrangements of neural network.

Overview

In the described embodiments, an electronic device that includes a neural network processor performs operations for processing instances of input data through a neural network. As described above, when processing instances of input data through the neural network, the neural network processor stores and reuses node result values for processing the instances of input data, which helps to avoid certain computations and memory accesses. The neural network processor is more effectively able to reuse result values, and thus avoid the computations and memory accesses, when current results/inputs generated by nodes in the neural network are similar to the stored results/inputs previously generated by nodes in the neural network. Similar results can be generated by nodes in the neural network when similar instances of input data are processed in sequence. For example, assuming that the neural network classifies images as including specified image elements, the reuse of result values is most efficient when two or more consecutive images have similar appearances, such as both including the specified image elements in similar locations, having colors and shapes that are similar, etc. In order to increase the effectiveness of using the result values, therefore, the described embodiments additionally include a presorter functional block that determines sorted orders in which instances of input data are to be processed by the neural network processor. In the sorted order, in comparison to an unsorted initial order of the instances of input data, a similarity between instances of input data is improved so that the efficiency of the reuse of results is also improved.

In some embodiments, when determining the sorted order, the presorter rearranges, if necessary, an initial order of some or all of multiple instances of input data so that instances of input data having specified similarities among the some or all of the sequence of instances of input data are located nearer to one another in the sorted order. In other words, the presorter rearranges the order of some or all of the instances of input data in such a way that a measure of relative difference between individual instances of input data across the three or more instances of input data is reduced—and may be minimized. For example, the presorter may determine the sorted order using a comparison sorting algorithm such as quicksort, heapsort, bubble sort, etc. Continuing the image classification example above, in some embodiments, the presorter uses a sorting algorithm to rearrange an initial order of N input images so that images that are more similar (e.g., have a similar pixel values, values for blocks of pixels, arrangements of colors or image elements, etc.) are relocated nearer to one another in the sorted order.

In some embodiments, when determining the sorted order, the presorter operates on a specified number, block, or "set" of instances or input data at a time. In these embodiments, the presorter receives or acquires a set of M instances of input data, or representations thereof, and determines the sorted order for the instances of input data. Continuing the image classification example above, the presorter may receive or acquire M images or representations thereof from an image source (e.g., a camera or image sensor, a memory or mass storage device, a network interface, etc.) for which a sorted order is to be determined. In some embodiments, the instances of input data or representation thereof are stored in a presort buffer having a number of locations for storing the instances of input data. In some embodiments, the above-described "representations" of instances of input data are simplified values that represent, in a reduced form, full values for corresponding instances of input data. Continuing the image classification example above, the representations can be downsampled or otherwise simplified images—such as a representation in which blocks or sections including multiple pixels from an image are represented by an average or median pixel value.

In some embodiments, when generating the sorted order, the presorter sorts the actual instances of input data, such as by relocating instances of input data in a memory or in a presort buffer. In these embodiments, when processing the instances of input data through the neural network, the neural network processor can retrieve the instances of input data in the sorted order for processing. For example, after the instances of input data have been sorted, the neural network processor can read the instances of input data from the presort buffer in sequence for processing. In some embodiments, the presorter does not sort the instances of input data, but instead generates an index that serves as the sorted order. In these embodiments, the presorter or another entity creates an index having a number of entries, each entry holding a value associated with a corresponding instance of input data from among a set of instances of input data. For example, the value in each position of the index may be a numerical representation, a bit pattern, etc. that represents the corresponding instance of input data in a reduced form. The presorter then sorts at least some of the entries in the index into an order, the sorting including relocating entries in the index based on a difference between the values therein and the values in one or more other entries. Note that, in these embodiments, the entries in the index are relocated/moved and not the instances of input data themselves. The presorter then provides, as the sorted order, the index to the neural network processor. When subsequently processing the instances of input data through the neural network, the neural network processor uses the index to determine which is the next instance of input data to be fetched (e.g., from memory, from a presort buffer, etc.) for processing through the neural network.

In some embodiments, a controller in the electronic device dynamically adjusts the operation of the presorter for determining sorted orders in order to improve the overall efficiency of the electronic device. Generally, for this operation, the controller configures the operation of the presorter so that the presorter is providing useful sorted orders, but without unnecessarily delaying the processing of instances of input data through the neural network, consuming more electrical power than is saved when processing the instances of input data in the sorted orders, etc. For example, the controller can incrementally increase an accuracy of a sorting operation until the balance between an efficiency of the presorter and an efficiency of the neural network processor reach a specified balance. In these embodiments, the controller records the efficiency of the presorter while the presorter determines sorted orders and the efficiency of the neural network processor while the neural network processor processes, in the sorted orders, instances of input data through the neural network. For recording the "efficiency" for the presorter and the neural network processor, the controller records one or more of an electrical energy consumption, a performance (e.g., a latency, a rate of operations, a bandwidth, etc.), and/or another operating characteristic of the presorter or neural network processor. The controller then determines a relationship (e.g., a difference, etc.) between the efficiencies of the presorter and the neural network processor. Based on the relationship, the controller adjusts one or more parameters, control values, or other settings that control or dictate how the presorter determines the sorted orders. For example, if the efficiency of the presorter is low with respect to the efficiency of the neural network processor (e.g., the presorter is consuming more electrical power than is being saved by the neural network processor by processing instances of input data in sorted orders), the presorter may be configured to perform sorting operations that consume less electrical power.

In some embodiments, for dynamically adjusting the operation of the presorter as described above, the controller adjusts the manner in which the presorter performs a sorting operation. In these embodiments, the particular adjustments that are made to the presorter depend on the sorting algorithm being used by the presorter for determining the sorted order. Generally, the adjustments are intended to either render the operation of the presorter relatively more efficient (when the efficiency of the presorter is low) or render the sorted order more precise (when the efficiency of the presorter is high). The adjustments may therefore be directed at adjusting a precision or "quality" of the sorting operation. For example, the controller may update a size or magnitude of difference between inputs below which the inputs are not relocated, which can help to avoid memory accesses for reordering indices, etc. In this case, instances of input data that have less than a specified difference (are at least somewhat similar) are not relocated when determining the sorted order. As another example, the controller may adjust or limit a number of sorting passes made over instances of input data. In these embodiments, given the adjustments to the presorter, the sorted order may not be an optimal sorted order (i.e., instances of input data may not be ideally sorted in accordance with a sorting algorithm used by the presorter), but even a partial sort can help to reduce the measure of relative difference between individual instances of input data in a sequence of instances of input data.

In some embodiments, the adjusting involves powering down or disabling the presorter. For example, the controller may clock gate the presorter or reduce a supply voltage or current provided to the presorter. In these embodiments, when the presorter is disabled, instances of input data may be processed in an initial and possibly unsorted order. In some of these embodiments, the presorter may eventually be powered up/re-enabled, such as after a specified amount of time has passed, one or more events have occurred, etc.

By providing sorted orders to the neural network processor, the presorter enables the neural network processor to process the instances of input data in an order that leads to more effective reuse of stored result values. The effective reuse of stored values can, in turn, lead to fewer and simpler computations for computing node result values, less memory accesses, and faster generation of outputs by neural networks. The improvement in the computation of results in neural networks, particularly given the large number of nodes and directed edges in many neural networks, improves the overall operation of electronic devices that perform processing operations for neural networks.

Electronic Device

Figure 2:
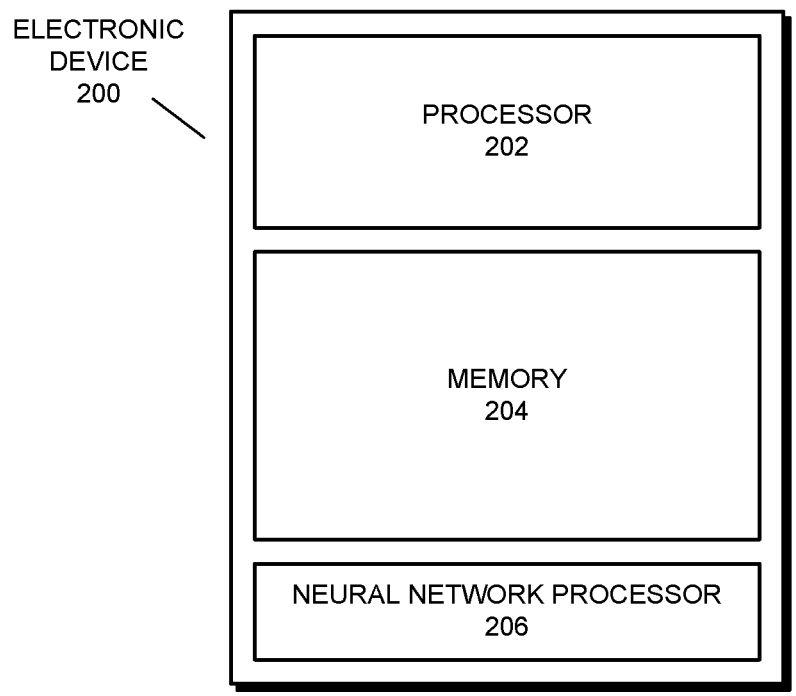
FIG. 2 presents a block diagram illustrating an electronic device in accordance with some embodiments.

In the described embodiments, an electronic device performs operations for, among other things, determining sorted orders for processing instances of input data through a neural network. FIG. 2 presents a block diagram illustrating an electronic device 200 in accordance with some embodiments. As can be seen in FIG. 2, electronic device 200 includes processor 202, memory 204, and neural network processor 206. Generally, processor 202, memory 204, and neural network processor 206 are implemented in hardware, i.e., using various circuit elements and devices. For example, processor 202, memory 204, and neural network processor 206 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, some or all of processor 202, memory 204, and neural network processor 206 perform operations associated with determining the sorted orders for processing instances of input data.

Processor 202 is a functional block that performs computational operations in electronic device 200. For example, processor 202 may be or include one or more central processing unit (CPU) cores, graphics processing unit (GPU) cores, application specific integrated circuits (ASICs), field programmable gate arrays (FPGAs), etc. In some embodiments, processor 202 includes circuit elements or functional blocks such as pipelines, execution units, compute units, etc. that execute program code that causes the circuit elements/functional blocks to perform associated operations. In some embodiments, processor 202 includes hardware circuits that are dedicated to (and possibly purpose-specific for) performing specified processing operations.

Memory 204 is functional block in electronic device 200 that performs operations of a memory (e.g., a "main" memory) for electronic device 200. Memory 204 includes memory circuits such as fourth-generation double data rate synchronous dynamic random access memory (DDR4 SDRAM), static random access memory (SRAM), and/or other types of memory circuits for storing data and instructions for use by functional blocks in electronic device 200 and control circuits for handling accesses of the data and instructions that are stored in the memory circuits and for performing other control or configuration operations.

Neural network processor 206 is a functional block that performs operations for processing instances of input data through a neural network and other operations. In some embodiments, neural network processor 206 includes circuit elements and functional blocks that are dedicated to and optimized for performing neural network processing operations—and may not perform general computing operations such as executing program code for an operating system or application program, etc. For example, neural network processor 206 may be included in a neural network accelerator functional block. In some embodiments, neural network processor 206 is or is included in a general-purpose processor such as a CPU or a GPU, which may execute program code to cause the general-purpose processor to perform operations of neural network processor 206.

Figure 3:
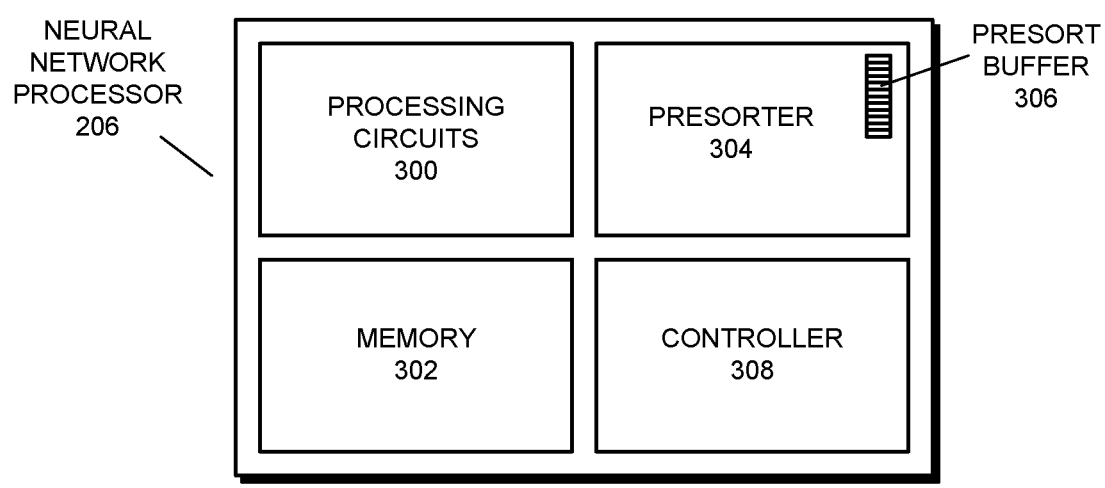
FIG. 3 presents a block diagram illustrating a neural network processor in accordance with some embodiments.

FIG. 3 presents a block diagram illustrating neural network processor 206 in accordance with some embodiments. As can be seen in FIG. 3, neural network processor 206 includes processing circuits 300, memory 302, presorter 304, and controller 308. Processing circuits 300 is a functional block that performs computational and other operations in neural network processor 206. In some embodiments, the computational operations performed by processing circuits 300 include operations for processing instances of input data through neural networks, such as preparation of input data (e.g., conversion of instances of input data into numerical or other input data formats, etc.), computation of internal values, evaluation of activation functions using internal values, computation of outputs for the neural network, training operations for the neural network (e.g., error computations, backpropagation of error values through the neural network to set weight values, etc.), and/or other processing operations. In the described embodiments, the computational operations performed by processing circuits 300 include operations associated with storing and reusing previous result values from nodes so that the stored previous result values can be used for determining current result values for the nodes as described herein.

Memory 302 is a functional block in neural network processor 206 that performs operations of a local memory for neural network processor 206. In some embodiments, memory 302 is used as a cache for locally storing copies of neural network values such as weights and bias values. During operation, as neural network values are to be used for corresponding computations, the neural network values are retrieved from memory 204 and copies are stored in memory 302. In some of these embodiments, the capacity of memory 302 is too small (in terms of available bytes of storage) to store all neural network data and thus memory 302 is managed using one or more replacement rules or policies. In some embodiments, along with or instead of the neural network values, memory 302 is used by processing circuits 300 for locally storing result values from nodes in the neural network when processing instances of input data through the neural network, the result values to be used for processing subsequent instances of input data through the neural network.

Presorter 304 is a functional block that performs operations for determining sorted orders for processing instances of input data through neural networks. During operation, presorter 304 receives instances of input data or representations thereof in an initial order and then determines, using one or more sorting algorithms (e.g., quicksort, heapsort, bubble sort, etc.) and/or sorting rules, a sorted order in which the instances of input data are to be processed by the neural network processor. In the sorted order, the overall similarity of neighboring instances of input data in the set of instances of input data is increased or improved (unless the initial order was already in sorted order), so that neighboring instances of input data are more likely to be similar. When determining the sorted order, therefore, presorter 304 can reduce or minimize the average distances between some or all of the instances of input data in the set of instances of input data, where the "average distance" is the pair-wise sum of differences between two instances of input data. After determining the sorted order, presorter 304 provides the sorted order to processing circuits 300 for use in determining an order in which the instances of input data in the set of instances of input data are to be processed.

In some embodiments, presorter 304 includes presort buffer 306, which is a functional block that includes memory circuits (e.g., DRAM, SRAM, etc.) that are configured for storing a set of instances of input data or representations thereof so that presorter 304 can determine the sorted order for the instances of input data in the set of instances of input data or representations thereof. Presort buffer 306 includes a number of locations, e.g., 64, 120, etc., each location including sufficient memory circuits to store an instance of input data or a representation thereof. In some embodiments, presort buffer 306 also includes control elements for controlling which locations are currently allowed to be used for storing instances of input data. In these embodiments, the control elements can be used to limit the number of locations used for storing instances of input data, and thus the size of the sets of instances of input data that are operated on by presorter 304. During operation, the control elements can be used to dynamically set and reset the number of locations in the presort buffer 306 that are available for storing instances of input data (e.g., based on an efficiency of presorter 304, etc.).

In some embodiments, when "determining" the sorted order, presorter 304 operates on/sorts actual instances of input data. For example, if a set of instances of input data are stored in an initial unsorted order at consecutive addresses or locations in a memory such as presort buffer 306, memory 302, or memory 204, presorter 304 can rearrange instances of input data in the memory into the sorted order by relocating instances of input data within the consecutive addresses or locations (which may mean using other memory to temporarily store instances of input data during the sorting). In these embodiments, when processing instances of input data through the neural network, processing circuits 300 can retrieve instances of input data from the memory in the sorted order (e.g., consecutively, from a head location to a tail location in the memory, etc.) and process the instances of input data in the order that they were retrieved.

In some embodiments, when determining the sorted order, presorter 304 operates on an index—and thus does not operate on the actual instances of input data. In these embodiments, when processing instances of input data in a set of instances of input data, presorter 304 creates or acquires an index with multiple entries, each entry holding a value associated with a corresponding instance of input data from among the set of instances of input data. For example, and continuing the image classification example, presorter 304 may acquire values representing each image in a set of images, e.g., vectors or other numerical values representing blocks of multiple pixels in the image, and store each of the values into a respective entry in the index in a memory (e.g., presort buffer 306, memory 302, etc.). Presorter 304 then sorts, using a sorting algorithm, at least some of the entries in the index into an order. For this operation, presorter 304 relocates entries in the index based on a difference between the values therein and the values in one or more other entries. In these embodiments, presorter 304 provides the index (e.g., a pointer to the index, the index itself, etc.) to processing circuits 300, which uses the index to determine an order in which instances of input data are retrieved for processing through the neural network. In these embodiments, when using the index, neural network processor 206 can acquire instances of input data from scattered and/or non-sequential locations in a memory, e.g., memory 204, presort buffer 306, etc. as indicated by the index.

In some embodiments, presorter 304 includes configurable circuit elements and functional blocks that can be used to control how presorter 304 determines the sorted order. For example, in some embodiments, presorter 304 keeps (e.g., in a register or memory location, etc.) a difference value threshold. In these embodiments, the difference value threshold indicates a lower limit for differences between instances of input data below which the instances of input data are not reordered, relocated, switched, etc. when determining the sorted order. As another example, in some embodiments, presorter 304 keeps (e.g., in a dedicated register or memory location, etc.) a number of sorting passes to be made when determining the sorted order. In these embodiments, the number of sorting passes is a number between a single sorting pass and a maximum number of sorting passes for a set of instances of input data in accordance with the sorting algorithm—where the "maximum" number of sorting passes is a number of sorting passes or iterations that would be made for ideally sorting the instances of input data in accordance with the sorting algorithm. As yet another example, in some embodiments, presorter 304 includes disabling circuit elements that can be used to disable or otherwise prevent presorter 304 from determining sorted orders. These circuit elements may include clock gating circuit elements, circuit elements for reducing or cutting off electrical voltage/current supply, etc.

Controller 308 is a functional block that controls at least some operations of presorter 304. During operation, controller 308 controls how presorter 304 determines sorted orders. For example, controller 308 can track the efficiencies of presorter 304 and processing circuits 300 when determining sorted orders and processing instances of input data, respectively, and use the efficiencies to configure how presorter 304 determines subsequent sorted orders. In doing so, controller 308 attempts to increase or maximize the amount of sorting done for instances of input data, which helps with the effectiveness of reusing stored results in processing instances of input data through the neural network. Controller 308 also attempts to ensure that the benefits of using presorter 304 to determine the sorted orders is not outweighed by the detriments of using presorter 304, such as electrical power consumption, latency, memory bandwidth consumption, etc. During operation, based at least in part on a difference between the efficiency of presorter 304 and processing circuits 300, controller 308 adjusts one or more parameters that control how presorter 304 determines subsequent sorted orders for processing subsequent sets of instances of input data through the neural network. For the adjustment, controller 308 sets or otherwise configures presorter 304 to perform sorting operations in specified ways—e.g., with particular numbers of sorting passes, with sets of instances of input data of given sizes, while relocating only certain instances of input data, etc.

Although neural network processor 206 is illustrated in FIG. 3 as including particular functional blocks and circuit elements, in some embodiments, a different number and/or arrangement of functional blocks and/or circuit elements is present in neural network processor 206. For example, and as described above, neural network processor 206 may be implemented using a general-purpose processor such as a CPU or GPU which executes program code to cause the general-purpose processor to perform the operations described herein.

Although electronic device 200 is shown as including particular functional blocks and circuit elements, electronic device 200 is simplified for illustrative purposes. In some embodiments, electronic device 200 includes additional or different functional blocks, subsystems, and/or circuit elements—or is included in a device that has additional or different functional blocks, subsystems, and/or circuit elements. For example, electronic device 200 or the device may include display subsystems, power subsystems, input-output (I/O) subsystems, etc. Generally, electronic device 200 includes sufficient functional blocks, etc. to perform the operations herein described.

Electronic device 200 can be, or can be included in, any device that performs computational operations. For example, electronic device 200 can be, or can be included in, a server computer, a desktop computer, a laptop computer, a wearable computing device, a tablet computer, a piece of virtual or augmented reality equipment, a smart phone, an artificial intelligence (AI) or machine learning device, a network appliance, a toy, a piece of audio-visual equipment, a home appliance, a vehicle, etc., and/or combinations thereof.

Figure 4:
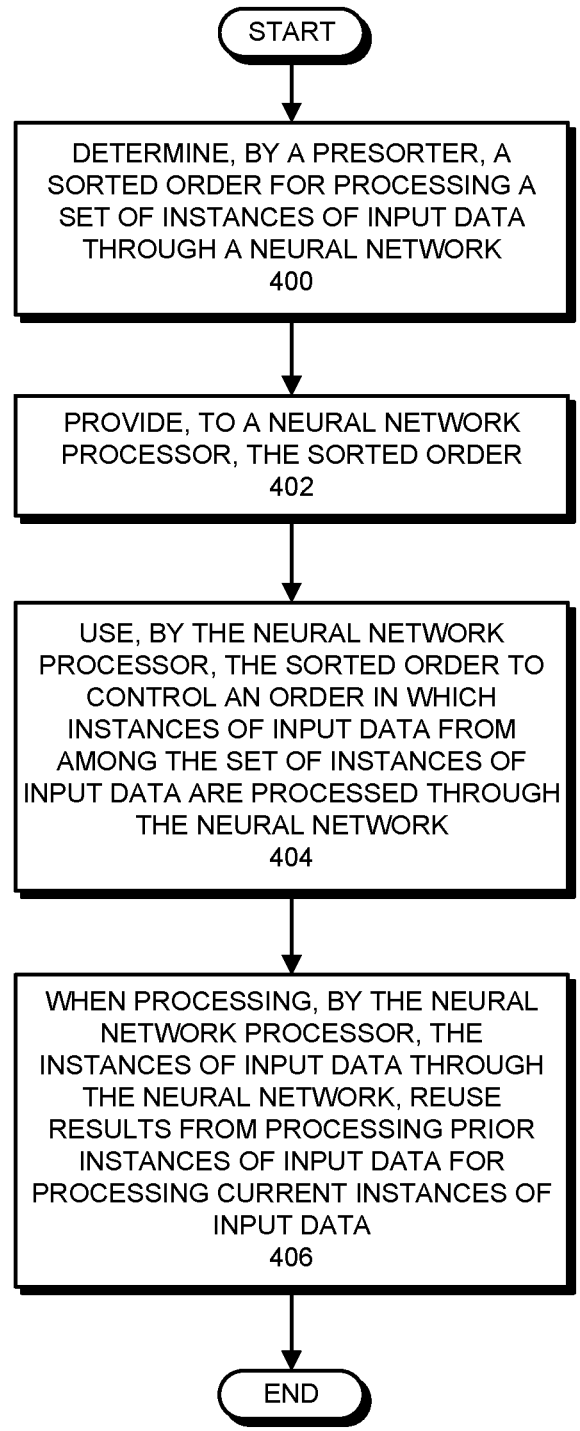
FIG. 4 presents a flowchart illustrating a process for determining and using a sorted order for processing instances of input data through a neural network in accordance with some embodiments.

Determining and Using Sorted Orders for Processing Instances of Input Data Through a Neural Network In the described embodiments, a presorter (e.g., presorter 304) performs operations for determining sorted orders in which instances of input data are to be processed through a neural network by a neural network processor (e.g., neural network processor 206). FIG. 4 presents a flowchart illustrating a process for determining and using a sorted order for processing instances of input data through a neural network in accordance with some embodiments. Note that the operations shown in FIG. 4 are presented as a general example of operations performed by some embodiments. The operations performed by other embodiments include different operations, operations that are performed in a different order, and/or operations that are performed by different entities or functional blocks.

In describing FIG. 4 and elsewhere herein, "normal" processing of instances of input data through the neural network is described. Generally, the normal processing of instances of input data involves computing values for internal elements of the neural network using common neural network operations—and does not involve the above-described reuse of results. In some embodiments, when "normally" processing an instance of input data through the neural network, input values are first determined for the instance of input data and the input values are provided as inputs to input nodes in the neural network. For instance, when the instance of input data is an image (i.e., for a neural network that performs image recognition), each input node may be provided with values representing the colors of one or more respective pixels from the image. A result of an activation function (e.g., a rectified linear unit (ReLU) function, a hyperbolic tan (tanh) function, a soft-step/logistic function, etc.) for each input node is computed using the respective input values and the results are forwarded to one or more intermediate nodes in the neural network. The weighted input values for intermediate nodes are then computed based on the results from the input nodes and weights associated with corresponding directed edges. The weighted input values are next summed to determine an internal value for each of the intermediate nodes. The internal values are then used to compute a result of an activation function for each intermediate node (e.g., a rectified linear unit (ReLU) function, a hyperbolic tan (tanh) function, a soft-step/logistic function, etc.) and the results are forwarded to downstream intermediate nodes. These operations in the intermediate nodes are repeated until reaching the last layer of intermediate nodes, from which the results are forwarded to output nodes and used to produce the output from the neural network. For example, and continuing the image recognition example above, the output from the neural network may be a value that indicates whether (or not) an image is likely to include a desired image element (e.g., a face, a dog, a particular number, etc.), such as being a value from 0, for very unlikely to include the image element, to 1, for very likely to include the image element.

As described herein, the presorter may operate on "representations" of instances of input data. The representations can be in any form for which sorting can be performed, such as bit values, numerical values, vectors, strings, etc. The representations can be computed, generated or otherwise determined using one or more mathematical, logical, bitwise, and/or other operations or combination thereof. For example, and continuing the image classification example, the representations of images/instances of input data can be any value that represents characteristics of the images, from bitwise representations (with, e.g., N-bit color values for each pixel in an image), to compressed or down-sampled representations (with, e.g., M-bit values representing average colors for a block of K pixels in the image), to heavily reduced or simplified values (e.g., values broadly representing general image characteristics). As another example, assuming that the neural network classifies audio samples, the representations of instances of input data/audio samples can include frequency component representations, transforms, spectral values, etc. In some embodiments, the representations of instances of input data are generated in preparation for the sorting operation, such as when the instances of input data are generated or acquired, during idle time for a processor (e.g., processor 202, etc.), as the sorted order is determined for the instances of input data, etc. In some embodiments, processing circuits in a neural network processor are used, during otherwise idle times (e.g., when not processing instances of input data through a neural network), for generating the representations of instances of input data. In some embodiments, a processor in memory, e.g., a processing functional block located on a memory integrated circuit (IC) die or on an IC die closely coupled to the memory IC die, performs operations for generating the representations of instances of input data. By using the representations of the instances of input data instead of the actual instances of input data, the sorting operations for determining sorted orders in the described embodiments may be simpler and faster. Note that, although using reduced, compressed, or down-sampled representations may result in less accurate sorting operations, and thus the generation of sorted orders that are less than ideal, the overall similarity of instances of input data in sorted orders can be an improvement over initial unsorted orders.

Although described together for FIG. 4, in some embodiments, the determination of the sorted order and the use of the sorted order for processing instances of input data through the neural network are separated in time and may occur on two or more different electronic devices. For example, in some embodiments, the presorter (or another processor, such as processor 202, etc.) receives the instances of input data and determines the sorted order independently of the processing of the instances of input data through the neural network. In these embodiments, the sorted order is eventually provided to the neural network processor for processing the instances of input data. In some embodiments, the presorter (or other processor) is in a separate electronic device, e.g., an electronic device that generates or preprocesses the instances of input data. In some embodiments, a processor in memory (PIM) determines the sorted order while the instances of input data are stored in a memory (e.g., memory 204, etc.).

For the operations in FIG. 4, it is assumed that the initial order in which instances of input data are received is unsorted, and thus in the sorted order the overall or average similarity of the instances of input data is improved. If instances of input data were to be received in sorted order, then the sorted order results in no change in the initial order—and the neural network processor uses the initial order as the sorted order for processing instances of input data through the neural network.

The operations in FIG. 4 start when the presorter functional block determines a sorted order for processing a set of instances of input data through a neural network (step 400). For this operation, the presorter receives or acquires the set of instances of input data or representations thereof in an initial order and performs one or more sorting operations to determine the sorted order. For example, a set of N instances of input data or representations thereof can be acquired from a memory (e.g., memory 204) by the presorter, processing circuits (e.g., processing circuits 300), and/or another entity and stored in a presort buffer (e.g., presort buffer 306) or an index in preparation for determining the sorted order. As another example, the presorter can receive or acquire a pointer to memory locations where the instances of input data or representations thereof are stored along with an indication of a number of instances of input data. As yet another example, the presorter can receive a stream of instances of input data or representations thereof, such as from a sensor (e.g., video or audio instances of input data from a sensor, etc.) or via a network.

In the described embodiments, the particular operations performed for determining the sorted order depend on the sorting algorithm(s) and other mechanisms that are used by the presorter, as well as the nature of instances of input data or representations thereof to be sorted. For example, in some embodiments, determining the sorted order involves performing a set of sorting passes through the instances of input data or representations thereof in order to arrange the instances of input data or representations thereof in the memory, presort buffer, index, etc. in order by similarity between the instances of input data. As another example, in some embodiments, determining the sorted order involves performing sorting operations on instances of input data or representations thereof as they arrive from a stream of received instances of input data. For the operation in FIG. 4, an example is provided using sorting passes through a set of instances of input data or representations thereof (e.g., in a presort buffer, a memory, etc.). The operations for other arrangements of instances of input data are similar, although altered to apply to the particular arrangements of instances of input data.

In some embodiments, when determining the sorted order, a similarity relationship for instances of input data is defined, retrieved, or acquired. For example, in some embodiments, the similarity relationship may be defined as a range of differences that can occur between instances of input data or representations thereof—i.e., from entirely different to matching. In some of these embodiments, and continuing the image classification example, the range of differences may be defined using a theoretical, experimental, historical, and/or specified (e.g., by a user, a software application, etc.) range of differences between individual pixels in the images and/or image elements (blocks of pixels, shapes, transitions in colors, etc.), and/or between values computed based on the images (e.g., numerical values representing image appearance, etc). Numerous techniques for determining similarity between the various possible types of instances of input data that might be processed in the described embodiments (e.g., images, video, audio, patterns, numerical values, etc.) are known in the art. Generally, the similarity relationship enables the presorter to determine a degree by which two instances of input data are (or are not) "similar," so that subsequent decisions can be made—e.g., whether to rearrange the two instances of input data for the sorted order, etc.

In some embodiments, for each sorting pass when determining the sorted order, starting from an initial position in the set of instances of input data, the presorter compares pairs of neighboring instances of input data or representations thereof and switches the instances of input data when a left instance of input data or representation thereof is not sufficiently similar to a right instance of input data or representation thereof based on opposing instance of input data value endpoints associated with each end of the order. In this way, the presorter moves or "bubbles" dissimilar instances of input data rightward in the order. On conclusion of the sorting operation, i.e., when a specified number of sorting passes have been made through the instances of input data or representations thereof, the sorted order includes the instances of input data or representations thereof in order of similarity from left to right. In other words, the presorter rearranges the order of some or all of the instances of input data in such a way that a measure of relative difference between individual instances of input data is reduced—and may be minimized. For example, in some embodiments, and in comparison to the initial order, in the sorted order, the average distances between instances of input data in the set of instances of input data are reduced, the average distance being a measurement such as the pair-wise sum of differences between pairs of instances of input data.

Figure 5:
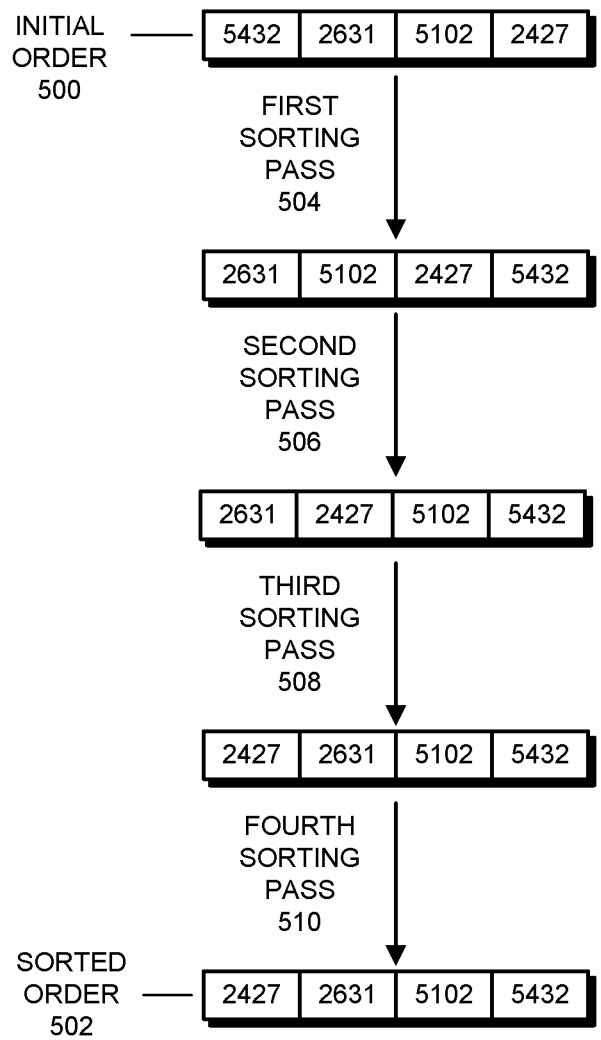
FIG. 5 presents a block diagram illustrating an example of determining a sorted order for a set of instances of input data in an initial order in accordance with some embodiments.

FIG. 5 presents a block diagram illustrating an example of determining a sorted order 502 for a set of instances of input data in an initial order 500 in accordance with some embodiments. In FIG. 5 a set of representations of instances of input data in an index are sorted based on a sorting relationship in which similarity is judged based on relative numerical values and the value endpoints are a lower value at the left end and a higher value at the right end. Note that, although FIG. 5 is presented as an example, there are numerous other sorting algorithms and corresponding sorting operations that may be used in the described embodiments. In addition, the simplified representations in FIG. 5 may be replaced with other forms of representations of instances of input data.

In first sorting pass 504 in FIG. 5, the instance of input data (or, rather, representation thereof) in the leftmost location in the index is compared to its neighboring instance of input data and switched, due to 5432 being dissimilar to and higher than 2631. This operation continues, comparing the instances of input data in neighboring locations and moving the value 5432 through the order to a final/rightmost location in the index, due to 5432 being dissimilar to and higher than both 5102 and 2427. In second sorting pass 506, the instance of input data in the leftmost location is compared to its neighboring instance of input data and no switch is made due to 2631 being dissimilar to but lower than 5102. This operation continues, however, moving instance of input data 5102 rightward as shown. Third sorting pass 508, using the same comparisons, switches the first two instances of input data, i.e., 2631 and 2427. The fourth sorting pass, which does not result in further values being moved due to the elements having been sorted in the third sorting pass, is a final sorting pass in accordance with the algorithm, which makes M passes to completely sort an M-instance set of instances of input data.

In some embodiments, determining the sorted order does not necessarily mean determining an ideal sorted order for instances of input data in a set of instances of input data in accordance with the corresponding sorting algorithm. In these embodiments, the sorting may be partial (i.e., may apply to only some instances of input data in a set of instances of input data), may be performed for less than a specified number of sorting iterations, may not be performed for certain instances of input data (e.g., instances of input data that are closer than a threshold difference in similarity), etc. In these embodiments, the sorted order is typically at least a small improvement over an initial order in terms of the similarity of nearby instances of input data in the order (where the initial order was not already sorted). This "improvement" can mean as little as reordering/swapping positions of two instances of input data from among many instances of input data in a set of instances of input data or as much as rearranging some or all instances of input data into an ideal sorted order in accordance with the corresponding sorting algorithm. Recall that the described embodiments determine the sorted order to enable more efficient reuse of stored result values in the neural network—a goal that is met with even smaller improvements in an initial order for instances of input data.

The presorter then provides the sorted order to a neural network processor (e.g., neural network processor 206) (step 402). For this operation, the presorter provides the neural network processor an indication, e.g., a signal or message, that indicates that the sorted order is ready—and thus the set of instances of input data are ready for processing through the neural network in the sorted order. For example, in step 400, the presorter may have rearranged the actual instances of input data into the sorted order in a memory (e.g., memory 204, presort buffer 306, etc.) and step 402 involves signaling the neural network processor to begin retrieving and processing instances of input data from the memory starting from a given location or address in the sorted order. As another example, in step 400, the presorter may have generated an index that indicates the sorted order (e.g., includes identifiers for instances of input data in the sorted order) and step 402 involves signaling the neural network processor that the index is ready for use in identifying instances of input data to be processed through the neural network in the sorted order.

The neural network processor then uses the sorted order to control an order in which instances of input data from among the set of instances of input data are processed through the neural network (step 404). For this operation, the neural network processor, based on the sorted order, selects, acquires, or retrieves instances of input data to be processed through the neural network. For example, this operation may involve the neural network processor starting at a particular location in a memory and fetching the instances of input data from sequential memory locations, the instances of input data having previously been put in the sorted order in the sequential memory locations by the presorter. As another example, the neural network processor may read instances of input data identifiers from an index (e.g., addresses of locations in memory, etc.) and retrieve the instances of input data from the memory in the order in which the identifiers appear in the index.

When processing instances of input data through the neural network using the sorted order, the neural network processor reuses results from processing prior instances of input data through the neural network for processing current instances of input data (step 406). As described above, for this operation, when processing a given instance of input data (e.g., a first instance of input data), through the neural network normally, the neural network processor stores results generated by nodes in layers of the neural network. Then, when processing one or more subsequent instances of input data (e.g., a second and/or subsequent instance of input data), the neural network processor determines a difference between inputs to nodes in layers and stored inputs to the nodes in the layers (recalling that the inputs to nodes in layers are the results of nodes in previous layers) and computes the results generated by the nodes in the layers by adjusting a corresponding stored result for each node based on differences, if any, between an inputs to that node and stored inputs to that node. Recall that reusing the stored results as described may enable the neural network processor to perform less computations and memory accesses when processing instances of input data through the neural network. In addition, using the sorted order improves the effect of reusing the results in the neural network by providing instances of input data for processing in an order in which similarity between instances of input is increased (i.e., relative to an unsorted initial order).

In some embodiments, the neural network processor includes sufficient computational functional blocks and circuit elements to perform the normal computations of internal values and activation functions when processing instances of input data through the neural network. Because the neural network processor reuses result values, however, some of these computational functional blocks and circuit elements, which are instead used for the computations associated with the reuse of result values, are left idle. This occurs due to the lower number and complexity of computations associated with reusing result values for processing similar instances of input data, as described above. In some embodiments, the idle computational functional blocks and circuit elements are powered down, clock gated, or otherwise configured in lower-power operating states in order to save electrical power, reduce heat generated by components, etc. In the same way, memory access elements may be configured in lower-power operating states when idle due to the reuse of results.

Adjusting Operation of a Presorter

Figure 6:
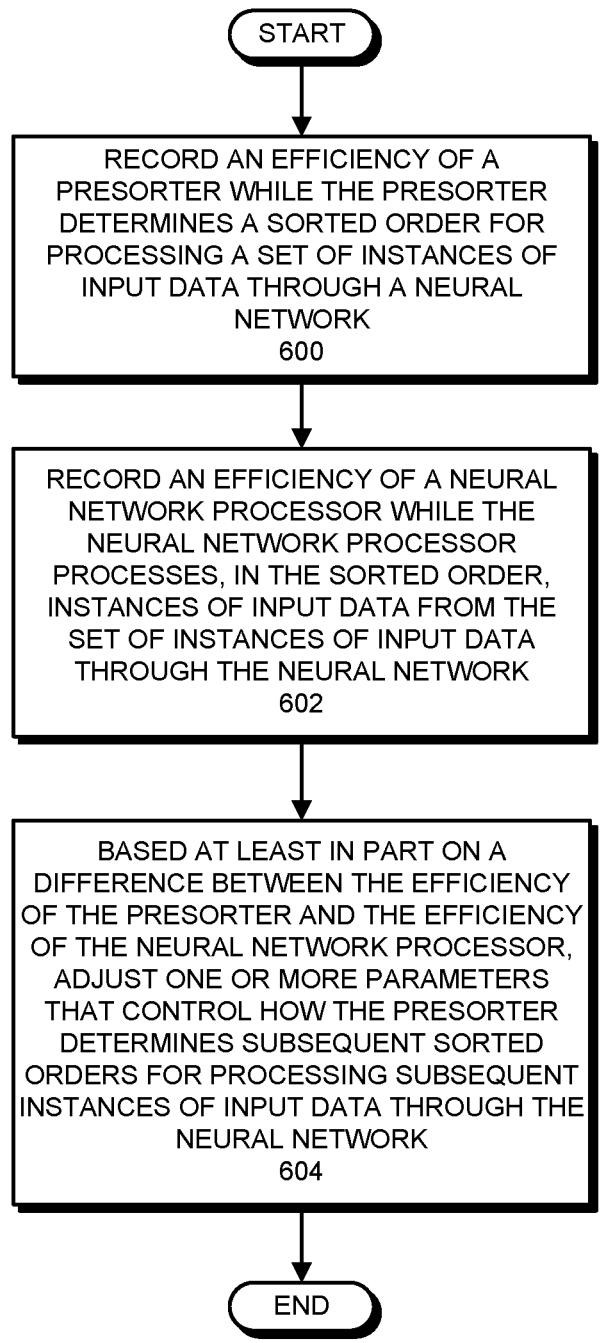
FIG. 6 presents a flowchart illustrating a process for adjusting operation of a presorter in accordance with some embodiments.

In the described embodiments, a presorter (e.g., presorter 304) performs operations for determining sorted orders in which instances of input data are processed through a neural network by a neural network processor. In an attempt to ensure that the benefits of using the presorter to determine the sorted orders (e.g., more effective reuse of result values when processing instances of input data through the neural network) are not outweighed by the detriments of using the presorter (e.g., electrical power consumption, delay, etc.), the described embodiments monitor the efficiency of using the presorter and dynamically adjust operations of the presorter. FIG. 6 presents a flowchart illustrating a process for adjusting operation of the presorter in accordance with some embodiments. Note that the operations shown in FIG. 6 are presented as a general example of operations performed by some embodiments. The operations performed by other embodiments include different operations, operations that are performed in a different order, and/or operations that are performed by different entities or functional blocks.

In describing FIG. 6, an "efficiency" of a presorter in determining a sorted order and an "efficiency" of a neural network processor in processing instances of input data through a neural network in the sorted order are described. Generally, the efficiencies are representative of one or more operational conditions or characteristics of the presorter and the neural network processor while performing the corresponding operations. The efficiencies can be or include any operational conditions or characteristics that can be used to judge whether (or not) the sorted orders being generated and provided by the presorter are worthwhile. For example, the efficiency may be determined based on one or both of an electrical energy consumption and a performance (e.g., a latency, a rate of operations/throughput, etc.) of the presorter and/or the neural network processor.

The operations shown in FIG. 6 start when a controller (e.g., controller 308) records an efficiency of a presorter while the presorter determines a sorted order for processing a set of instances of input data through a neural network (step 600). For this operation, the controller measures, computes, or otherwise detects the operational conditions or characteristics being used to indicate the efficiency and records/stores these values. For example, while the presorter determines the sorted order, the controller may count a number of operations performed or measure a time taken and, using an operations-power conversion or time-power conversion, compute the amount of electrical power consumed. As another example, the controller may monitor a voltage and current provided to the presorter and a time taken for the presorter to determine the sorted order and then use these values to compute the amount of electrical power consumed.

The controller also records an efficiency of the neural network processor while the neural network processor processes, in the sorted order, instances of input data from the set of instances of input data through the neural network (step 602). As described above, this operation involves the controller measuring, computing, or otherwise detecting the operational conditions or characteristics being used to indicate the efficiency and recording/storing these values.

Based at least in part on a difference (or other relationship) between the efficiency of the presorter and the efficiency of the neural network processor, the controller adjusts one or more parameters that control how the presorter determines subsequent sorted orders for processing instances of input data through the neural network (step 604). For this operation, the controller uses one or more rules, records, tables, or conversions to determine if and how the operation of the presorter is to be adjusted based on the two efficiencies. For example, in some embodiments, given efficiency A for the presorter (which may indicate or represent mW of electrical power consumed, mS of time, and/or other values) and efficiency B for the neural network processor (which may indicate or represent mW of electrical power saved in using the sorted order, mS of time saved, etc.), the controller performs a lookup in a table that relates adjustments to the presorter to A/B efficiency combinations. As another example, in some embodiments, given efficiency A for the presorter in terms of mW of electrical power consumed and efficiency B for the neural network processor in terms of mW of electrical power consumed or saved, the controller subtracts A-B and adjusts the presorter based on the difference. In some embodiments, and generally, the above-described adjustment of parameters is intended to balance the efficiencies of the presorter and the neural network processor so that the corresponding operational conditions or characteristics offset one another. For example, in some embodiments, the operational characteristics are the electrical power consumed by each of the presorter and an estimated savings in electrical power consumed by the neural network processor, and the balance is to ensure that the presorter does not consume more electrical power in generating the sorted order than the neural network processor saves in using the sorted order for processing instances of input data through the neural network.

In some embodiments, the adjustment of the one or more parameters that control how the presorter determines subsequent sorted orders involves adjusting a difference value threshold. In these embodiments, sorting the at least some of the instances of input data or representations thereof into the sorted order includes skipping relocating instances of input data or representations thereof when the difference between the instances of input data or representations thereof is less than a difference value threshold. By adjusting the difference value threshold, these embodiments increase or reduce the number of instances of input data or representations thereof that may be relocated during sorting passes, which increases or reduces the number of corresponding memory accesses (and thus the memory system bandwidth used, the delay in performing operations, and the electrical power consumed). As described above, adjusting such a parameter can mean that less-than-ideal sorted orders will be generated for instances of input data, but at least some benefit of reusing result values may still be obtained.

In some embodiments, the adjustment of the one or more parameters that control how the presorter determines subsequent sorted orders involves adjusting a specified number of sorting passes that are to be performed during a sorting operation. In these embodiments, sorting algorithms may indicate or be associated with a particular number of sorting passes that are to be made in order to generate an ideal sorted order. The adjustment means that the presorter can be dynamically configured to use any number of sorting passes, from one sorting pass to the particular number of sorting passes. By adjusting the specified number of sorting passes, these embodiments increase or reduce the number of sorting passes, which increases or reduces the number of computations and number of memory accesses (and thus the electrical power consumed, the delay in performing operations, and the memory system bandwidth used). As described above, adjusting such a parameter can mean that less-than-ideal sorted orders will be generated for instances of input data, but at least some benefit of reusing result values may still be obtained.

In some embodiments, the adjustment of the one or more parameters that control how the presorter determines subsequent sorted orders involves adjusting a number of locations in a presort buffer (e.g., presort buffer 306). In these embodiments, the presorter includes a presort buffer and each instance of input data from among the set of instances of input data or a representation thereof is stored in a corresponding location in the presort buffer while the presorter determines the sorted order. Adjusting the one or more parameters involves increasing or decreasing a number of the locations that are permitted to be used for storing instances of input data or representations thereof, thereby increasing or decreasing a number of instances of input data in subsequent sets of instances of input data to be processed through the neural network. In other words, the controller can control the size of sets of instances of input data for which the presorter determines sorted orders. Increasing or decreasing sets of instances of input data is associated with corresponding increases or decreases in computational complexity for the sorting operations, which means increased or decreased electrical power consumption, delay, and memory accesses.

In some embodiments, the adjustment of the one or more parameters that control how the presorter determines subsequent sorted orders involves disabling the presorter so that the presorter does not determine sorted orders for at least some instances of input data. In these embodiments, the presorter may be wholly or partially placed in a lower-power operating mode, transitioned to a non-responsive state, etc., so that the presorter does not determine sorted orders. For example, a supply voltage and/or current may be discontinued, a controlling clock may be disabled, an enable signal may be deasserted, etc. Disabling the presorter avoids the consumption of electrical power, delay, and memory accesses (although the benefits of using sorted orders for processing instances of input data through the neural network are also lost). Note that the presorter may eventually be re-enabled, such as after a given time has passed, when a specified event occurs, after processing M instances of input data through the neural network without sorted orders, etc.

In some embodiments, the controller automatically adjusts the one or more parameters that control how the presorter determines subsequent sorted orders in order to seek out a particular balance between an efficiency of the presorter and an efficiency of the neural network processor. In these embodiments, the controller may increase the accuracy or quality of the sorting operations using the above-described adjustments to the difference value threshold, the specified number of sorting passes, and/or the number of available locations in the presort buffer, etc. until the particular balance is reached—and decrease the accuracy or quality if the particular balance is overshot. In other words, the controller may "try" different accuracies or qualities of the sorting operations in an attempt to find a "best" sorting operation for which the efficiencies meet or exceed the particular balance. As described above, the particular balance may be expressed in terms of electrical energy consumed/saved, latency, rate or operations/throughput, memory accesses, etc.

In some embodiments, an electronic device (e.g., electronic device 200 and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), functional blocks, controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 200, neural network processor 206, presorter 304, controller 308, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device that processes instances of input data through a neural network, the electronic device comprising:
   a neural network processor; and
   a presorter, the presorter configured to:
      determine a sorted order to be used by the neural network processor for processing a set of instances of input data through the neural network, the determining comprising rearranging an initial order of some or all of the instances of input data so that instances of input data having specified similarities among the some or all of the instances of input data are located nearer to one another in the sorted order; and
      provide, to the neural network processor, the sorted order to be used for controlling an order in which instances of input data from among the set of instances of input data are processed through the neural network by the neural network processor.

2. The electronic device of claim 1, wherein determining the sorted order comprises:
   generating or acquiring an index having a plurality of entries in the initial order, each entry holding a value associated with a corresponding instance of input data from among the set of instances of input data;
   sorting at least some of the entries in the index into an order, the sorting comprising relocating, in accordance with a sorting algorithm, entries in the index based on a difference between the values therein and the values in one or more other entries; and
   using, as the sorted order, the order of the entries in the index.

3. The electronic device of claim 2, wherein the value associated with the corresponding instance of input data in each entry of the index is a value that represents, in a reduced form, a full value for the corresponding instance of input data.

4. The electronic device of claim 2, further comprising:
   a controller, the controller configured to:
      record an efficiency of the presorter while the presorter determines the sorted order for processing the set of instances of input data through the neural network;
      record an efficiency of the neural network processor while the neural network processor processes, in the sorted order, instances of input data from the set of instances of input data through the neural network; and
      based at least in part on a difference between the efficiency of the presorter and the efficiency of the neural network processor, adjust one or more parameters that control how the presorter determines subsequent sorted orders for processing subsequent sets of instances of input data through the neural network.

5. The electronic device of claim 4, wherein:
   sorting the at least some of the entries in the index into the order comprises skipping relocating entries in the index when the difference between the values therein and the values in one or more other entries is less than a difference value threshold; and
   adjusting the one or more parameters comprises adjusting the difference value threshold.

6. The electronic device of claim 4, wherein:
   sorting the at least some of the entries in the index into the order comprises limiting a number of sorting passes through the index to a specified number of sorting passes that is less than a full number of sorting passes in accordance with the sorting algorithm; and
   adjusting the one or more parameters comprises adjusting the specified number of passes.

7. The electronic device of claim 4, further comprising:
   a presort buffer having a set of locations, each instance of input data from among the set of instances of input data or a representation thereof being stored in a corresponding location in the presort buffer while the presorter determines the sorted order;
   wherein adjusting the one or more parameters comprises increasing or decreasing a number of the locations that are permitted to be used for storing the instances of input data or representations thereof, thereby increasing or decreasing a number of instances of input data in subsequent sets of instances of input data.

8. The electronic device of claim 4, wherein adjusting the one or more parameters comprises disabling the presorter so that the presorter does not determine a sorted order for processing at least some subsequent instances of input data through the neural network, wherein the presorter is subsequently re-enabled when a condition is met.

9. The electronic device of claim 4, wherein the controller is further configured to compute each efficiency based on one or more of an electrical energy consumption and a performance.

10. The electronic device of claim 1, wherein the neural network processor is configured to, while processing the instances of input data through the neural network in the sorted order, reuse results from processing instances of input data through the neural network by:
    when processing a given instance of input data, store results generated by nodes in layers of the neural network; and
    when processing an other instance of input data:
       determine differences, if any, between inputs to nodes in layers and stored inputs to the nodes in the layers, wherein the inputs to the nodes in the layers are results that are presently generated by nodes in preceding layers when processing the other instance of input data, and wherein the stored inputs to the nodes in the layers are results that were generated by nodes in preceding layers when processing the given instance of the input data; and
       compute the results generated by the nodes in the layers as a corresponding stored result with adjustments based on the differences, if any, between inputs to that node and stored inputs to that node.

11. A method for processing instances of input data through a neural network in an electronic device that includes a neural network processor and a presorter, the method comprising:
    determining, by the presorter, a sorted order to be used by the neural network processor for processing a set of instances of input data through the neural network, the determining comprising rearranging an initial order of some or all of the instances of input data so that instances of input data having specified similarities among the some or all of the instances of input data are located nearer to one another in the sorted order; and providing, by the presorter, to the neural network processor, the sorted order to be used for controlling an order in which instances of input data from among the set of instances of input data are processed through the neural network by the neural network processor.

12. The method of claim 11, wherein determining the sorted order comprises:

generating or acquiring an index having a plurality of entries in the initial order, each entry holding a value associated with a corresponding instance of input data from among the set of instances of input data;

sorting at least some of the entries in the index into an order, the sorting comprising relocating, in accordance with a sorting algorithm, entries in the index based on a difference between the values therein and the values in one or more other entries; and using, as the sorted order, the order of the entries in the index.

13. The method of claim 12, wherein the value associated with the corresponding instance of input data in each entry of the index is a value that represents, in a reduced form, a full value for the corresponding instance of input data.

14. The method of claim 12, wherein:

the electronic device includes a controller; and the method further comprises:

recording, by the controller, an efficiency of the presorter while the presorter determines the sorted order for processing the set of instances of input data through the neural network;

recording, by the controller, an efficiency of the neural network processor while the neural network processor processes, in the sorted order, instances of input data from the set of instances of input data through the neural network; and based at least in part on a difference between the efficiency of the presorter and the efficiency of the neural network processor, adjusting, by the controller, one or more parameters that control how the presorter determines subsequent sorted orders for processing subsequent sets of instances of input data through the neural network.

15. The method of claim 14, wherein:

sorting the at least some of the entries in the index into the order comprises skipping relocating entries in the index when the difference between the values therein and the values in one or more other entries is less than a difference value threshold; and adjusting the one or more parameters comprises adjusting the difference value threshold.

16. The method of claim 14, wherein:

sorting the at least some of the entries in the index into the order comprises limiting a number of sorting passes through the index to a specified number of sorting passes that is less than a full number of sorting passes in accordance with the sorting algorithm; and adjusting the one or more parameters comprises adjusting the specified number of passes.

17. The method of claim 14, wherein:

the electronic device further comprises a presort buffer having a set of locations, each instance of input data from among the set of instances of input data or a representation thereof being stored in a corresponding location in the presort buffer while the presorter determines the sorted order; and adjusting the one or more parameters comprises increasing or decreasing a number of the locations that are permitted to be used for storing the instances of input data or representations thereof, thereby increasing or decreasing a number of instances of input data in subsequent sets of instances of input data.

18. The method of claim 14, wherein adjusting the one or more parameters comprises disabling the presorter so that the presorter does not determine a sorted order for processing at least some subsequent instances of input data through the neural network, wherein the presorter is subsequently re-enabled when a condition is met.

19. The method of claim 14, further comprising:

computing each efficiency based on one or more of an electrical energy consumption and a performance.

20. The method of claim 11, further comprising:

while processing, by the neural network processor, the instances of input data through the neural network in the sorted order, reusing results from processing instances of input data through the neural network by:

when processing a given instance of input data, storing results generated by nodes in layers of the neural network; and when processing an other instance of input data:

determining differences, if any, between inputs to nodes in layers and stored inputs to the nodes in the layers, wherein the inputs to the nodes in the layers are results that are presently generated by nodes in preceding layers when processing the other instance of input data, and wherein the stored inputs to the nodes in the layers are results that were generated by nodes in preceding layers when processing the given instance of the input data; and computing the results generated by the nodes in the layers as a corresponding stored result with adjustments based on the differences, if any, between inputs to that node and stored inputs to that node.

* * * * *